United States Patent
Hollander

(10) Patent No.: US 8,770,624 B2
(45) Date of Patent: Jul. 8, 2014

(54) IMPACT PROTECTION

(76) Inventor: Kevin L. Hollander, Winston-Salem, NC (US)

(*) Notice: Subject to any disclaimer, the term of this patent is extended or adjusted under 35 U.S.C. 154(b) by 262 days.

(21) Appl. No.: 12/383,658

(22) Filed: Mar. 27, 2009

(65) Prior Publication Data

US 2009/0189383 A1    Jul. 30, 2009

Related U.S. Application Data

(63) Continuation-in-part of application No. 11/503,380, filed on Aug. 11, 2006, now abandoned.

(60) Provisional application No. 60/718,385, filed on Sep. 19, 2005.

(51) Int. Cl.
*B60R 22/28* (2006.01)
*B60R 21/18* (2006.01)
*B60R 22/14* (2006.01)

(52) U.S. Cl.
CPC ............. *B60R 21/18* (2013.01); *B60R 22/14* (2013.01)
USPC ........... 280/805; 89/36.02; 89/36.05; 89/914; 188/377; 2/2.5

(58) Field of Classification Search
USPC ............. 280/805, 748, 801.1, 733; 297/482, 297/487, 488; 188/377, 371, 376; 267/153, 267/147, 148, 149, 158; 89/908, 909, 914, 89/917, 36.02, 36.05; 2/2.5; 428/911
See application file for complete search history.

(56) References Cited

U.S. PATENT DOCUMENTS

| | | | | |
|---|---|---|---|---|
| 2,675,969 A * | 4/1954 | Stauffer | ............. | 241/52 |
| 2,861,285 A * | 11/1958 | Sawyer | ............. | 14/52 |
| 3,431,818 A * | 3/1969 | King | ............. | 89/36.02 |
| 3,444,033 A * | 5/1969 | King | ............. | 428/49 |
| 3,666,055 A * | 5/1972 | Walker et al. | ............. | 188/376 |
| 3,941,404 A * | 3/1976 | Otaegui-Ugarte | ............. | 280/733 |
| 4,969,386 A * | 11/1990 | Sandstrom et al. | ............. | 89/36.02 |
| 5,045,371 A * | 9/1991 | Calkins | ............. | 428/49 |
| 6,406,088 B1 * | 6/2002 | Tate | ............. | 296/187.03 |
| 6,530,564 B1 * | 3/2003 | Julien | ............. | 267/147 |
| 6,902,193 B2 * | 6/2005 | Kim et al. | ............. | 280/801.1 |
| 7,363,846 B1 * | 4/2008 | Dean et al. | ............. | 89/36.05 |
| 7,367,898 B2 * | 5/2008 | Hawkins et al. | ............. | 473/329 |
| 7,461,726 B2 * | 12/2008 | Hawkins et al. | ............. | 188/371 |
| 2006/0065111 A1 * | 3/2006 | Henry | ............. | 89/36.02 |

FOREIGN PATENT DOCUMENTS

JP      2002316613 A  * 10/2002  ............. B60R 21/24

\* cited by examiner

*Primary Examiner* — Paul N Dickson
*Assistant Examiner* — Joselynn Y Sliteris
(74) *Attorney, Agent, or Firm* — MKG, LLC

(57) ABSTRACT

A method of vehicular safety management is disclosed in which a garment or like product is worn by an occupant of the vehicle. The garment includes crushable elements which absorb or dissipate energy on fracture from impact. An article of manufacture is disclosed which is worn by a vehicle occupant during travel and which incorporates component elements which fracture on impact and thereby dissipate collision energy.

7 Claims, 2 Drawing Sheets

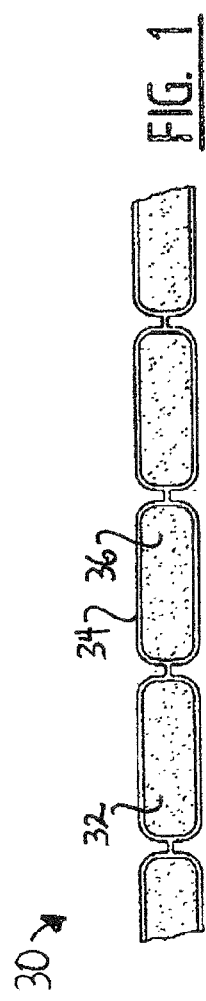
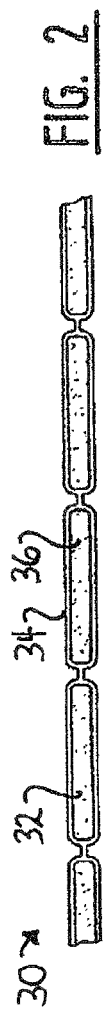
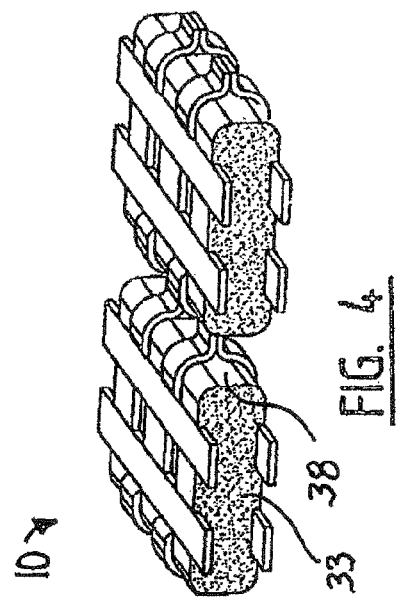
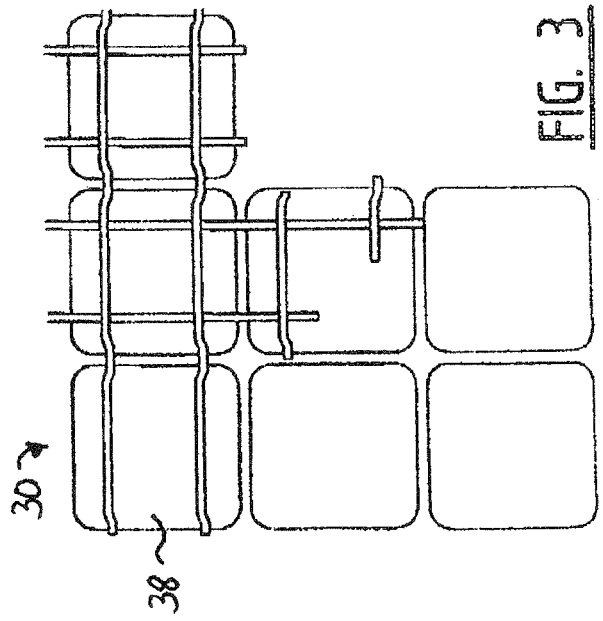

IMPACT PROTECTION

This application is a continuation-in-part of application Ser. No. 11/503,380 filed Aug. 11, 2006 now abandoned by the same inventor.

This invention relates to improvements in impact protection and more particularly to vehicular passenger safety management and to collision impact control.

It is recognized that deployment of safety impact devices in vehicles may result in passenger injury from the concentrated force of, for example, explosion of an expanding air bag against a passenger or driver. Wider distribution of impact force provides protection from, for example, the violence of bag explosion and conserves the bag cushion effect. Release of impact energy is absorbed and dissipated by deformation and/or crushing and/or by frangible shattering of at least one layer of friable safety material disposed at the time of impact between the agent of impact, e.g., the bag, and the person of a passenger or driver. Energy released by a generalized impact is distributed over a much wider area than when it is released by point impact, such as occurs when struck by a projectile which penetrates ordinary clothing of a person. Both generalized and point impact are attenuated by deformation of a layer of impact shielding in which crushing or shattering generates heat and protects, for example, the vehicle occupant, from impact harm. Shattering results in conversion, crumbling or comminution by impact force of a large brittle structure or pallet into many smaller fragments. Conversion of mechanical energy or energy of motion into heat is substantial. For example, the energy of a moving automobile dissipated by its brakes (e.g., 60 mph to a full stop) shows the conversion of substantial mechanical energy of motion into frictional heat or thermal energy.

It is an object of this invention to provide a system and an article of manufacture, which is protective of a user from impact injury. The article is useful to protect, for example, against air bag impact harm in a moving vehicle. When the system is used with an air bag and/or safety belt, multiple features of protection are afforded from each separate protective device (i.e., a bag and/or a belt or harness restraint).

It is an object of this invention to provide a method of impact protection in which at least one layer of a solid shatter able material is positioned about the person, of a vehicular passenger or driver, for example, in combination with a garment or strap worn on the body. The protective fragile layer is preferably incorporated in a flexible garment or seat belt or air bag construction, such as by insertion into pockets, capsules, blisters, cells or cavities formed in the garment or within the garment fabric structure.

According to a preferred version and best mode of the invention, a segmented cellular fabric product is located between an air bag or seat belt harness and the person of a passenger. A garment, such as a shield, jacket, coat, vest or corset, is made from flexible fabric and includes at least one further layer of solid, rigid core impact protection material, which shatters when forcefully struck. Additional layers of protection may be fitted on either inner or outer surface about the core rigid shatter able impact protection layer, such as crushable and/or flexible layer (e.g., metal foil), as in safety glass sandwich construction, to retain shatter debris after an impact by sufficient force to break up the solid shatter able layer associated with the fabric into very small pieces, and thus to dissipate the force of impact by release of the energy of cohesion of the core impact layer.

EXAMPLE

Force absorbing cells are seen in the drawing in FIGS. 1,3 and 4 which are deployed within the flexible fabric matrix from which a safety garment such as a vest of FIG. 6 or corset is constructed. The flexible cells deform (compress) on impact, exceeding a preset or measured known force compression value, as seen in FIG. 2, so that the internal solid impact material shatters into many very small pieces (such as grains of sand or grit within the cell) and impact force is attenuated and reduces the risk of passenger injury. The comminuted solid shatter debris is retained within the flexible compressed cells as seen in FIG. 2.

A preferred version of the invention involves method steps in which:

(a) a person wears an impact protection garment, such as the vest of FIG. 6, of woven or unwoven fabric, which is secured against the body by a restraint belt, strap or harness to which it is attached as seen in FIG. 5. When in use in a vehicle, a driver or passenger wears a garment over and against the body, such as a vest of FIG. 6, together with a transverse seat belt or safety strap disposed over the vest to secure its placement as seen in FIG. 6.

(b) the vest of FIG. 6 is impacted by a blow or collision (such as with or against a steering wheel or with the inner structure of the vehicle) heavy or powerful enough to deform the crushable and frangible contents of segmented components of the garment, and to shatter the impact material brittle core elements of the vest within separate segmented garment fabric cells, which are arranged as a grid as seen in FIGS. 3 and 5 and are held in place by stitching or by flexible springs or wires, for example, which act as a matrix scaffold for the quilted cells of impact protection safety segments of the garment as seen in FIG. 4.

(c) when an air bag is also in use with the garment it may be integral with the belt or is a part of the garment and provides multiple cooperative safety features, such as resilient cushioning.

A method of safety management in vehicular impact and collision management comprises the steps of:

(a) protecting a driver or passenger from impact injury by wearing a system of a flexible fabric garment over the body together with a seat belt or harness.

(b) providing a core layer of brittle solid shatter able impact material incorporated with said garment within flexible separate segmented cellular fabric cavities, which secure impact shatter fragments after impact, from injury by fragments of said brittle impact material and against fragment dispersion, and (c) securing the driver or passenger and garment within a vehicle by belt or harness restraint, before, during and after impact.

In this method energy absorption elements shatter or fragment into small fragments or sand like grit when impact force exceeds a predetermined magnitude or force level. In one method the elements are of cement and in another version elements are of ceramic; or both materials may be used together.

The article of manufacture comprises the combination of a system of a flexible compartmented fabric garment and a seat belt or harness in which said garment incorporates a cellular quilted segmented matrix and a friable layer of said matrix includes solid brittle, frangible elements which disintegrate under impact force to produce a comminuted dust or sand like product trapped within the flexible cell structure and said elements dissipate the energy of impact to provide protection. The elements are of ceramic and/or of cement.

The article of manufacture may additionally include a layer of flexible sheet material adjoining a friable core of said brittle elements. Said flexible sheet deforms on impact without disintegration and holds together the debris of the disintegrated frangible elements.

It is important that the protective frangible impact elements of the article of manufacture are not dense and are of lightweight for wearing, and that retention means, such as a pouch, compartment or blister, are provided to protect the user from missile type inquiry by fragments after shatter and single use destruction by impact.

FIG. 1 illustrates impact pallets before impact in a passenger worn garment, which incorporates several, single impact or one use controlled deformable safety elements according to a first embodiment of the invention.

FIG. 2 shows the crushing effect of impact on the inner elements of a garment including the structure of FIG. 1.

FIGS. 1 and 2 show use of sheet pallets of crushable and deformable impact material, which may be of rigid brittle foam, ceramic, cement or of similar composite brittle formation and may further include crumpled aluminum sheets and/or a further flexible safety film layer which does not itself shatter. When the impact material deforms and shatters energy is released as heat and multiple small fragments or sand like grit may result and be retained within the fabric cells.

FIG. 2 is an exploded cut away edge view of a cellular section of the fabric construction of FIG. 1 showing the internal cellular deployment of multiple crushable brittle protection elements after impaction.

FIG. 3 shows internal impaction elements after impaction, as secured in a support matrix as seen in plan view.

FIG. 4 shows criss-cross flat springs which deform only partly on impact and thereafter return at least partly to original configuration and function to support the impact elements in un-shattered original position, for example, during the conditions of normal vehicle operation.

Figure 5:
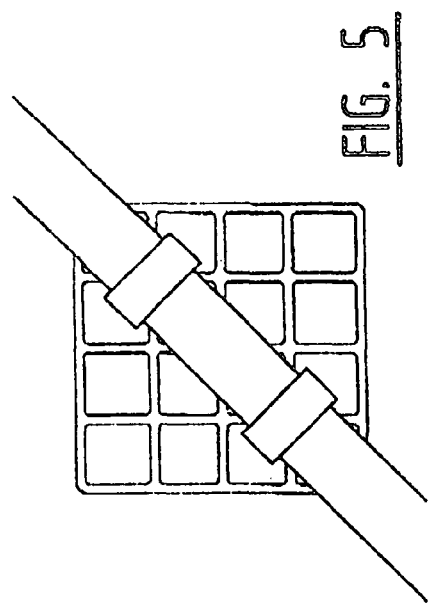

FIG. 5 shows attachment of the fabric device to a seat belt or harness.

Figure 6:
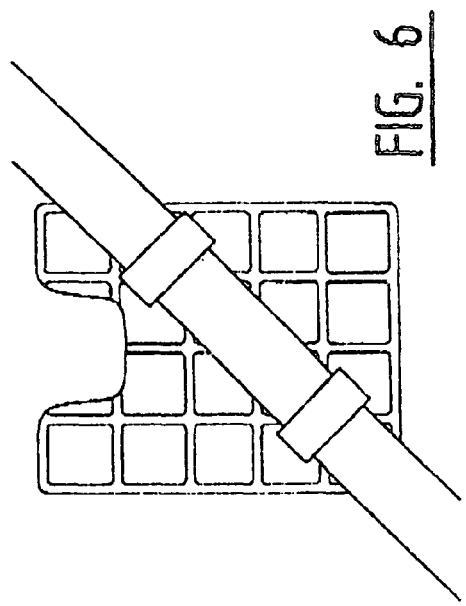

FIG. 6 shows a harness and vest worn by a driver or passenger.

Figure 7:
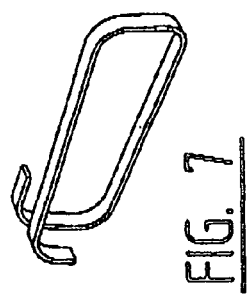

FIG. 7 shows a flat coil spring used in the method and article of the invention.

Figure 8:
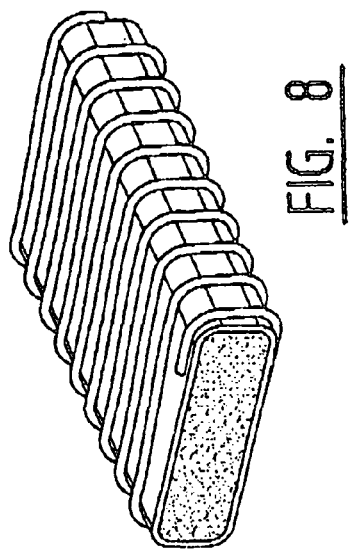

FIG. 8, like FIG. 4, shows springs, supporting impact elements, as used during minor impacts too weak to cause shattering.

The invention claimed is:

1. A multi-layer fabric structure configured to provide impact protection for a body of a vehicular passenger in a vehicular collision, the fabric structure comprising:
    a fabric layer defining a plurality of segmented cellular fabric cavities comprising a matrix arrangement of fabric cells, the matrix arrangement defined by at least one spring;
    a friable layer of frangible elements disposed within each of the plurality of segmented cellular fabric cavities;
    the frangible elements configured to disintegrate under impact force; and
    the plurality of segmented cellular fabric cavities configured to retain the disintegrated frangible elements.

2. The multi-layer fabric structure of claim 1, wherein the matrix arrangement is formed by joining adjacent fabric cells.

3. The multi-layer fabric structure of claim 1, wherein the at least one spring is a flat coil spring.

4. The multi-layer fabric structure of claim 1, wherein the frangible elements comprise at least one of a rigid brittle foam, ceramic and cement.

5. The multi-layer fabric structure of claim 1, wherein the fabric structure defines a garment configured to be worn on the body of the vehicular passenger.

6. The multi-layer fabric structure of claim 1, wherein the fabric structure is integral with at least one vehicular safety feature.

7. The multi-layer fabric structure of claim 6, wherein the fabric structure is integral with a seat belt.

\* \* \* \* \*